No. 840,314. PATENTED JAN. 1, 1907.
S. J. GRAY & J. HORNING.
SAWING MACHINE.
APPLICATION FILED MAR. 20, 1906.
4 SHEETS—SHEET 1.
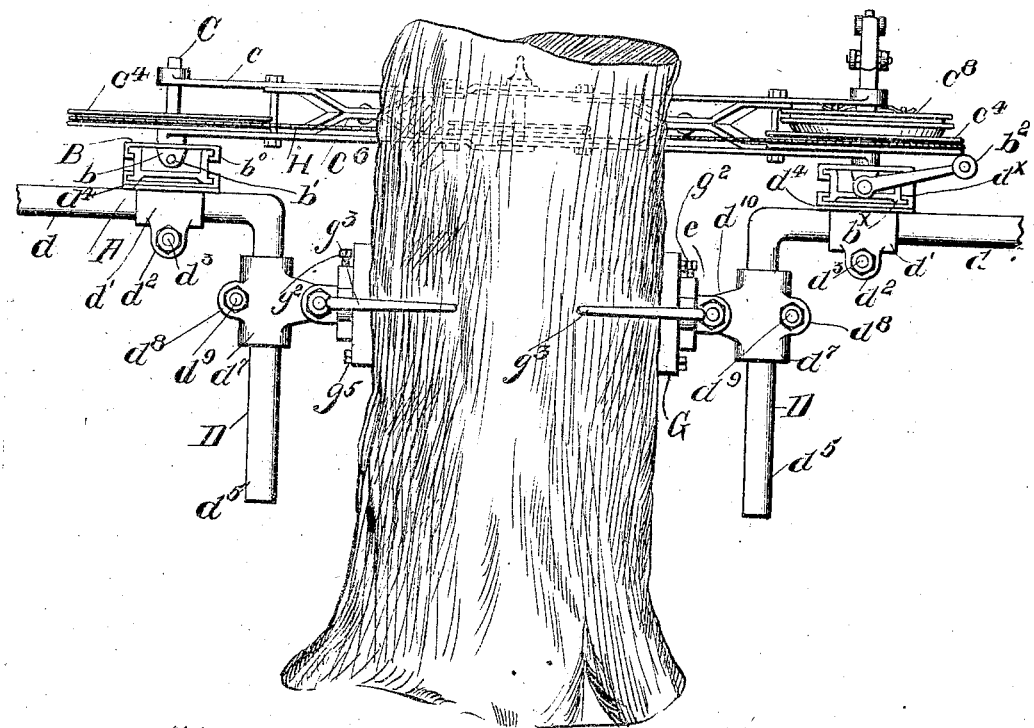
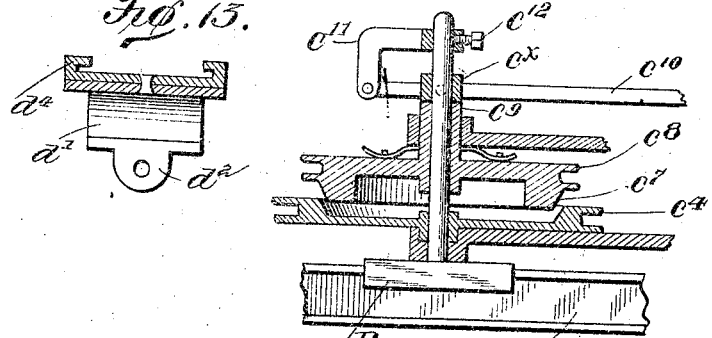
WITNESSES:
INVENTORS
Simon J. Gray
John Horning
BY
ATTORNEYS No. 840,314. PATENTED JAN. 1, 1907.
S. J. GRAY & J. HORNING.
SAWING MACHINE.
APPLICATION FILED MAR. 20, 1906.
4 SHEETS—SHEET 2.
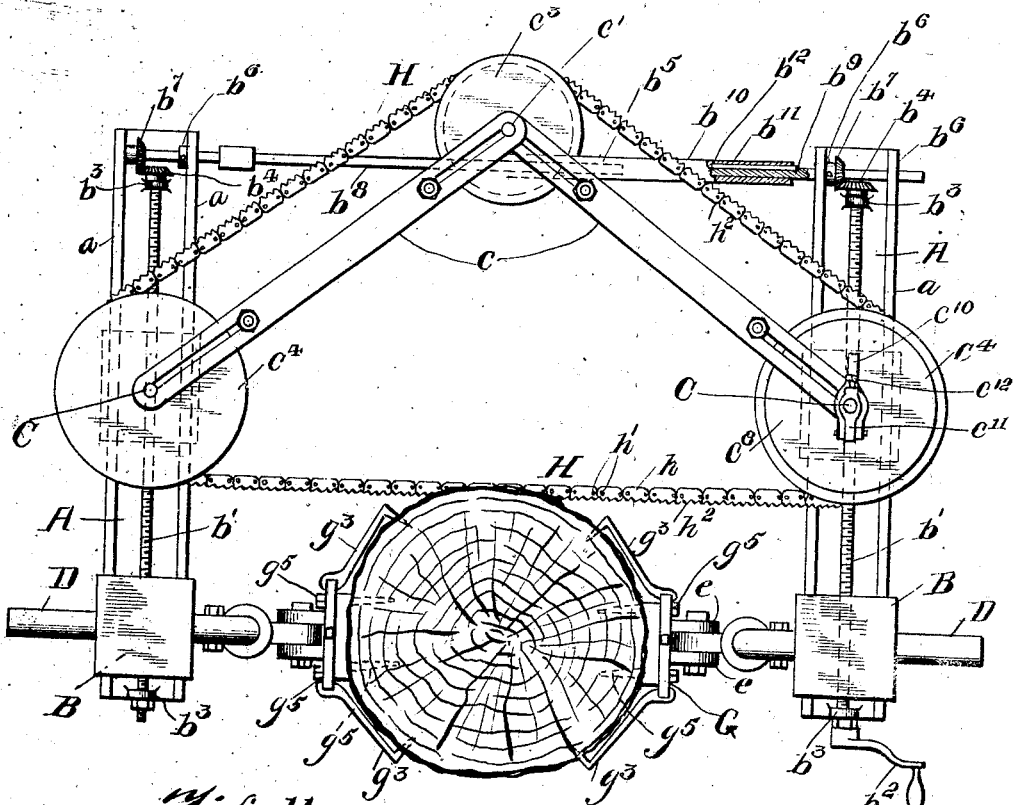
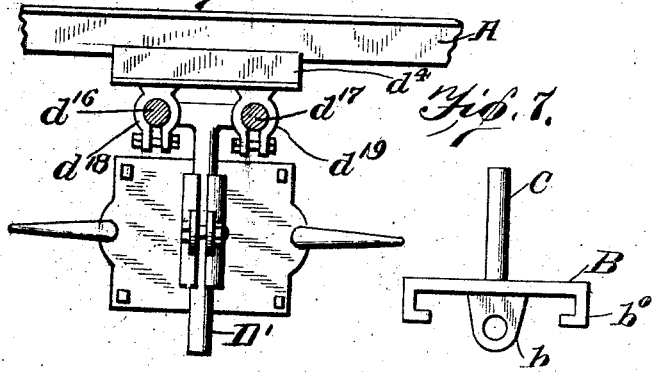
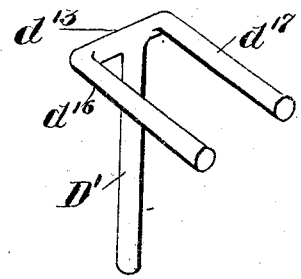
WITNESSES:
INVENTORS
Simon J. Gray.
John Horning.
BY
ATTORNEYS No. 840,314. PATENTED JAN. 1, 1907.
S. J. GRAY & J. HORNING.
SAWING MACHINE.
APPLICATION FILED MAR. 20, 1906.
4 SHEETS—SHEET 3.
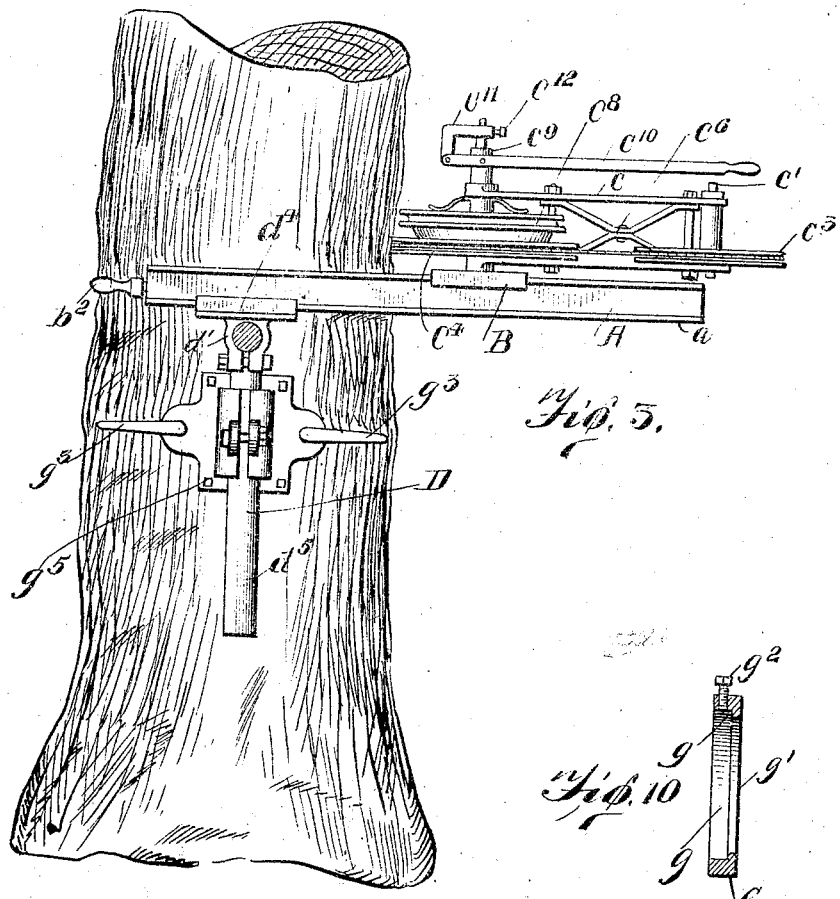
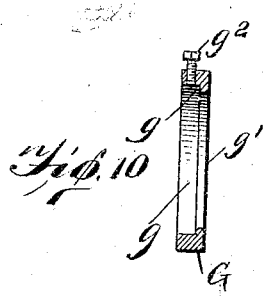
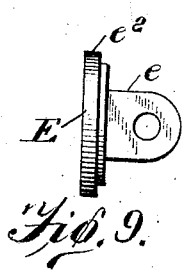
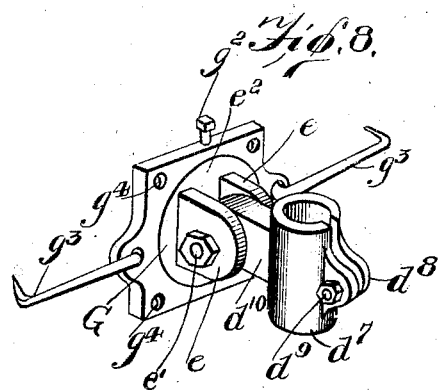
WITNESSES:
D. C. Wilson
C. E. ...
INVENTORS
Simon J. Gray
John Horning
BY Munn & Co.
ATTORNEYS No. 840,314. PATENTED JAN. 1, 1907.
S. J. GRAY & J. HORNING.
SAWING MACHINE.
APPLICATION FILED MAR. 20, 1906.
4 SHEETS—SHEET 4.
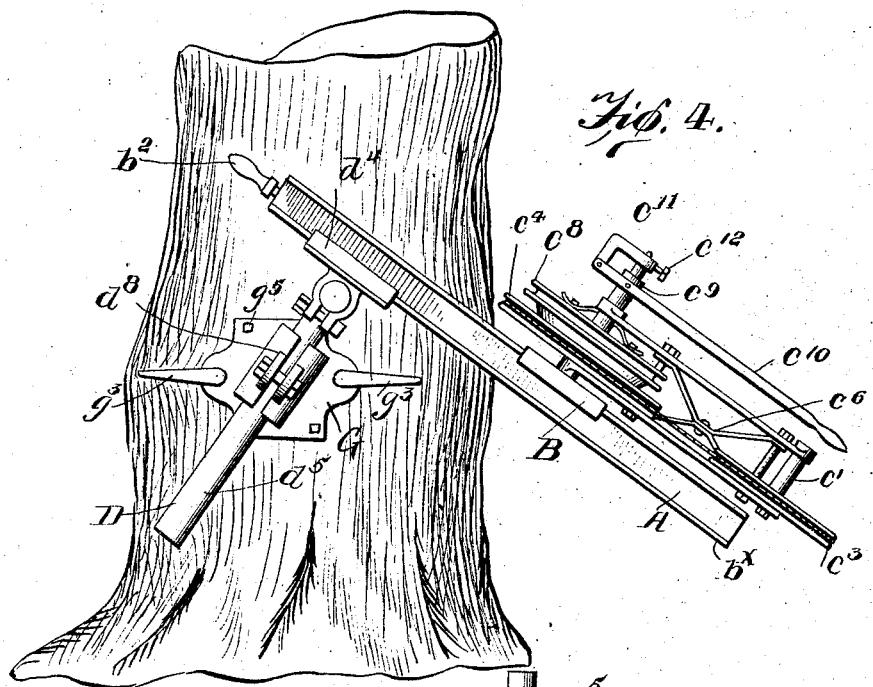
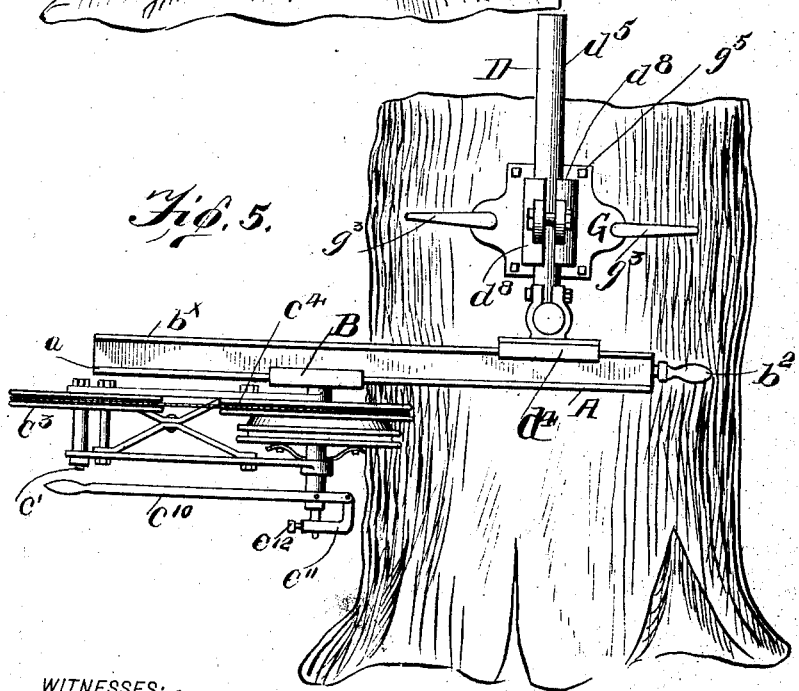
WITNESSES:
INVENTORS
Simon J. Gray
John Horning
BY
ATTORNEYS

UNITED STATES PATENT OFFICE.

SIMON J. GRAY AND JOHN HORNING, OF OAKLAND, CALIFORNIA.

SAWING-MACHINE.

No. 840,314.                Specification of Letters Patent.                Patented Jan. 1, 1907.

Application filed March 20, 1906. Serial No. 306,993.

*To all whom it may concern:*

Be it known that we, SIMON J. GRAY and JOHN HORNING, citizens of the United States, and residents of Oakland, in the county of Alameda and State of California, have made certain new and useful Improvements in Sawing-Machines, of which the following is a specification.

Our invention is an improvement in sawing-machines; and it consists in certain novel constructions and combinations of parts hereinafter described and claimed.

In the drawings, Figure 1 is a front view of our improved machine in position for sawing down a tree. Fig. 2 is a plan view of the same. Fig. 3 is a side view. Fig. 4 is a side view showing the machine arranged for an upwardly-inclined cut. Fig. 5 is a similar view showing the position for sawing close to the ground. Fig. 6 is a vertical section through the clutching mechanism. Fig. 7 is a detail of one of the channel-plates. Fig. 8 is a detail perspective view of the plate for attachment to the tree. Fig. 9 is a detail of the swivel-block, and Fig. 10 is a central vertical section through the plate for attachment to the tree. Fig. 11 is a front view of a modified form of angle-bar and channel-plate. Fig. 12 is a perspective view of the angle-bar alone. Fig. 13 is a longitudinal section of the split ring and the channel-plate connected therewith.

In the practical application of our invention we provide a plurality of bars A, upon which are mounted channel plates or brackets B, the flanges $b^0$ of the channel-plates being inturned to engage flanges $a$ on the sides of the bars A.

The channel plates or brackets B are provided with lugs $b$, having screw-threaded openings, and the openings are traversed by screw-threaded rods $b'$, journaled in bearings $b^3$ at each end of the bars. One of the rods $b'$ is provided with a handle $b^2$, and each of the rods is provided at its outer end with a bevel-gear $b^4$, meshing with bevel-gears $b^7$ upon the ends of a telescoping rod $b^5$, having one end journaled in a bearing $b^6$ upon each bracket.

Stud-shafts C project upwardly from the brackets B, and a frame $c$, comprising upper and lower plates connected by trusses $c^6$, is journaled upon the stud-shafts, the outer ends of the frames being connected to each other by a bolt $c'$, upon which is journaled a grooved pulley $c^3$. Grooved pulleys $c^4$ are journaled upon the stud-shafts, and an endless saw H is supported by the pulleys $c^3$ $c^4$. A driving-pulley $c^8$ is journaled upon one of the stud-shafts, said driving-pulley being movable longitudinally of the shaft and provided with one part of a friction-clutch $c^7$, the other part of the clutch being on the grooved pulley on the same shaft. The stud-shaft bearing the driving-pulley is extended upwardly, and a bracket $c^{11}$ is secured to said extended end by a set-screw $c^{12}$. A sliding sleeve $c^9$ is integral with the driving-pulley $c^8$ upon the shaft and is forced into contact with the grooved pulley $c^4$ to connect the clutch parts by means of a lever $c^{10}$, pivoted to the bracket and to a collar $c^x$, engaging the end of the sleeve. It will be evident from the description that the frame for supporting the saw may be described as having a recess for receiving the object to be sawed and that one run of the saw extends across said recess.

Means are provided for supporting the bars A, comprising angle-bars D, the upper legs $d$ of the angle-bars being engaged by split rings $d'$, having ears $d^2$, traversed by bolts $d^3$, whereby to tighten the rings upon the angle-bars, and having swiveled thereto channel-plates $d^4$, similar to the channel-plate B, before described, the channel-plates $d^4$ being provided with inturned flanges $d^x$, engaging flanges $b^x$ upon the lower edges of the bars.

The lower legs $d^5$ of the angle-bars are engaged by split rings $d^7$, having ears $d^8$, traversed by bolts $d^9$, and having upon the opposite side from the ears a lug $d^{16}$, the said lug being received between spaced ears $e$ upon a block E, the ears and the bolts being traversed by a bolt $e'$, whereby to tighten the ears upon the lug to prevent motion of the split ring with respect to the block.

The block E is provided with a cylindrical body $e^2$, engaging a circular recess $g$ in a plate G, the body being retained in the recess by a flange $g'$, and a set-screw $g^2$ traverses the block and engages the cylindrical body, whereby to fix the block with respect to the plate. The plate G is provided with dogs $g^3$, pivoted thereto and extending upon either side thereof for engaging the object to be sawed, and with perforations $g^4$, adapted for the passage of drift-bolts $g^5$, used for a similar purpose.

In operation the plates G are placed upon each side of the object to be sawed and the dogs are engaged firmly therewith. If necessary, the drift-bolts are also inserted. The angle-bars D are then adjusted to a suitable height in the split rings and clamped in place, the blocks E being fixed with respect to the plates G at such position as to bring the saw to the required angle with respect to the object to be sawed. The bars A are then adjusted upon the upper legs of the angle-bars at a suitable distance from the tree or other object. By means of the handle $b^2$ upon the screw-threaded rod $b'$ the run of the saw nearest the tree is moved into position thereagainst, after which the driving-pulley is clutched to the grooved pulley.

The telescoping rod $b^5$ comprises two members $b^8$ $b^9$, connected by a sleeve $b^{10}$, each of said members $b^8$ $b^9$ being provided with a key $b^{11}$, moving in a groove $b^{12}$ of the sleeve. This arrangement allows the plates A to move toward and from each other to provide for different-sized objects, and the provision of the frames $c$ permits the grooved pulleys upon the stud-shafts to move toward and from each other, while at the same time retaining the saw in a taut condition. The rotation of the screw-threaded rod bearing the handle $b^2$ through its connection with the telescoping rod rotates the other rod $b'$, thus moving the grooved pulleys in unison, whereby to feed the saw.

Any preferred form of endless saw may be used with our improved sawing-machine, and in the present instance we have shown a link saw H, comprising a plurality of links $h$, pivotally connected, as at $h'$, and provided upon their outer faces with the teeth $h^2$.

Our improved sawing-machine is easily transported from place to place and is supported directly by the object to be sawed, thus dispensing with considerable weight. It may be positioned to cut at an angle upward or downward or may be reversed upon the plates G when it is desired to saw close to the roots of a tree. Any suitable means may be used for imparting motion to the driving-pulley $c^8$.

The frame $c$ might be described as comprising legs pivotally connected and having the saw-supporting pulleys journaled in the free ends of the legs and at the point of pivotal connection, the space between the legs being the recess into which is received the object to be sawed.

In Figs. 11 and 12 we have shown a modified form of the angle-bar and the channel-plate for supporting the saw-carrying bars, in which the angle-bar D' is forked at $d^{13}$ and provided with two angular arms $d^{16}$ $d^{17}$. Two split rings $d^{18}$ $d^{19}$ engage the arms, the said rings being secured to the channel-plate in any suitable manner. The above-described form is preferable in some respects, since it forms a wider base-support for the bar A.

Having thus described our invention, what we claim as new, and desire to secure by Letters Patent, is—

1. In a sawing-machine, the combination of a plurality of spaced bars, brackets slidably mounted on the bars, and provided with lugs having screw-threaded openings, screw-threaded rods journaled on the bars and engaging the openings in the lugs, bevel-gears on the rods at one end thereof, a telescoping rod having one end journaled upon each bar and provided with a bevel-gear meshing with the bevel-gears on the screw-threaded rods, stud-shafts journaled on the brackets, an A-shaped frame comprising pairs of spaced plates, one end of each pair being journaled upon a stud-shaft, and the other end overlapping the corresponding end of the other pair, a bolt traversing the overlapping ends, a grooved pulley journaled on the bolt, grooved pulleys journaled on the stud-shafts, an endless saw supported by the pulleys, a driving-pulley on one of the stud-shafts, clutch mechanism for connecting the driving-pulley with the grooved pulley, means for supporting each of the bars, and means for attaching said supporting means to the object to be sawed.

2. In a sawing-machine, the combination with a frame comprising legs pivotally connected at one end, grooved pulleys journaled in the free ends of the legs, and at the point of pivotal connection, an endless saw supported on the pulleys, bars for supporting the free ends of the legs, means for adjusting the legs on the bars, an angle-bar having one leg adjustably connected with the supporting-bar, a block adjustably connected with the other leg of the angle-bar, a plate having dogs pivoted thereto and adapted to engage the object to be sawed, a swivel connection between the block and the plate, and means for fixing the block with respect to the plate.

3. In a sawing-machine, the combination of a frame comprising pairs of spaced plates, a bolt connecting the pairs at one end of the plates, grooved pulleys journaled between the plates at the free ends thereof and on the bolt, bars for supporting the free ends of the pairs, means for adjusting the said free ends in unison on the bars, an endless saw supported by the pulleys, means for attaching the bars to the object to be sawed, and means for adjusting the bars with respect to the attaching means.

4. In a sawing-machine, the combination of an A-frame, the legs thereof being pivotally connected, grooved pulleys journaled at the corners of the frame, bars connected with the legs of the frame, means for adjusting said legs in unison on the bars, means connected with the bars for engaging the objects to be sawed, and means for adjusting the bars on the engaging means, an endless saw supported by the pulleys, and means for driving one of the pulleys.

5. In a sawing-machine the combination with a frame comprising legs pivotally connected at one end, grooved pulleys journaled in the free ends of the legs, and at the point of pivotal connection, an endless saw supported on the pulleys, angle-bars having one leg connected with a leg of the frame, means for adjusting the legs of the frame longitudinally of the legs of the angle-bars, means for adjusting the frame transversely of the angle-bars, said frame being rotatable upon the angle-bars, means on the other legs of the angle-bars for engaging the object to be sawed, and means for adjusting the angle-bars on the engaging means.

6. In a sawing-machine, a frame comprising pivotally-connected legs, grooved pulleys, journaled in the free ends of the legs and at the point of connection, an endless saw supported on the pulleys, means for driving one of the pulleys, bars for engaging opposite sides of the object to be sawed, and connected with the free ends of the legs, and means for adjusting the frame with respect to the bars.

7. In a sawing-machine, the combination with a frame, comprising legs pivotally connected at one end, pulleys journaled in the free ends of the legs and at their point of connection, an endless saw supported on the pulleys, means engaging one of the pulleys for driving the saw, means for engaging opposite sides of the objects to be sawed, and means whereby to adjust the frame with respect to the said engaging means.

8. In a sawing-machine, the combination with a frame comprising legs pivotally connected at one end, pulleys journaled at the corners of the frame, an endless saw supported on the pulleys, means engaging one of the pulleys for driving the saw, means for engaging opposite sides of the object to be sawed and means for adjustably connecting the free ends of the legs with said engaging means.

SIMON J. GRAY.
JOHN HORNING.

Witnesses:
 JOHN T. BELL,
 ALBERT F. CONNETT.